(12) United States Patent
Jeon et al.

(10) Patent No.: US 12,038,988 B2
(45) Date of Patent: Jul. 16, 2024

(54) METHOD AND APPARATUS FOR MODELING USER PREFERENCES (71) Applicant: Samsung Electronics Co., Ltd., Suwon-si (KR)

(72) Inventors: Jehun Jeon, Suwon-si (KR); Jangsu Lee, Seoul (KR); Inkyu Choi, Seoul (KR); GyuBum Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/698,667

(22) Filed: Mar. 18, 2022

(65) Prior Publication Data
US 2023/0126117 A1     Apr. 27, 2023

(30) Foreign Application Priority Data

Oct. 26, 2021     (KR) .................. 10-2021-0143931

(51) Int. Cl.
G06F 16/9535     (2019.01)

(52) U.S. Cl.
CPC ................. G06F 16/9535 (2019.01)

(58) Field of Classification Search
CPC ............ G06F 16/9535; G06F 16/735; G06F 16/90324; G06N 20/00
See application file for complete search history.

(56) References Cited

U.S. PATENT DOCUMENTS

| 7,603,331 B2 | 10/2009 | Tuzhilin et al. |
| 7,860,811 B2 | 12/2010 | Flinn et al. |
| 7,970,664 B2 | 6/2011 | Linden et al. |
| 9,251,527 B2 * | 2/2016 | Shah ................. G06Q 30/0204 |
| RE46,310 E | 2/2017 | Hoffberg et al. |
| 9,631,944 B2 | 4/2017 | Cho et al. |
| 10,503,762 B2 | 12/2019 | Franceschini et al. |
| 10,963,942 B1 * | 3/2021 | Franke .............. G06Q 30/0627 |
| 2018/0039910 A1 * | 2/2018 | Hari Haran ....... G06F 16/24578 |
| 2021/0011958 A1 * | 1/2021 | Cox ..................... G06F 16/435 |
| 2021/0406988 A1 * | 12/2021 | Oh ........................... G06N 5/01 |

(Continued)

FOREIGN PATENT DOCUMENTS

| KR | 10-2008-0093120 A | 10/2008 |
| KR | 10-2008-0105866 A | 12/2008 |

(Continued)

*Primary Examiner* — Apu M Mofiz
*Assistant Examiner* — Oscar Wehovz
(74) *Attorney, Agent, or Firm* — NSIP Law (57) ABSTRACT A user preference modeling method including receiving preference scores corresponding to items, receiving an input for selecting an item from among the items, decaying a preference score corresponding to one or more items from among the items included in a first list and a second list based on a time decay rate and a first parameter, in response to the selected item being included in the first list, decaying the preference score corresponding to the one or more items comp included in the first list and the second list based on a time decay rate and a second parameter, in response to the selected item being included in the second list, and increasing a preference score corresponding to the selected item, wherein the first list may include one or more of the plurality of items based on the preference scores, and wherein the first list is different from the second list.

19 Claims, 6 Drawing Sheets (56) References Cited

U.S. PATENT DOCUMENTS

2022/0058489 A1* 2/2022 Volkovs ............. G06Q 30/0282
2023/0101928 A1* 3/2023 Pande ..................... G06N 5/04
                                                    705/26.7

FOREIGN PATENT DOCUMENTS

| KR | 10-2009-0123398 A | 12/2009 |
| KR | 10-2011-0078233 A | 7/2011 |
| KR | 10-2012-0016723 A | 2/2012 |
| KR | 10-2015-0101340 A | 9/2015 |
| KR | 10-2012676 B1 | 8/2019 |
| KR | 10-2020-0072207 A | 6/2020 |

* cited by examiner

This is the reservation status of the "Recommendation Conference Room" for October 13.

| Conference room | 7 | 8 | 9 | 10 | 11 | 12 | 13 | 14 | 15 | 16 |
|---|---|---|---|---|---|---|---|---|---|---|
| 2-302 [5 people] | | | | | | | | | | |
| 2-304 [6 people] | | | | | | | | | | |
| 2-305 [3 people] | | | | | | | | | | |
| 2-306 [4 people] | | | | | | | | | | |
| M-304 [54 people] | | | | | | | | | | |

FIG.3

|  | One recommendation item | Two recommendation item | Three recommendation item | Four recommendation item | Five recommendation item |
| --- | --- | --- | --- | --- | --- |
| 410 — Frequency recommendation | 0.336 | 0.530 | 0.663 | 0.744 | 0.796 |
| 420 — Preference decay function recommendation based on time | 0.386 | 0.586 | 0.710 | 0.778 | 0.820 |
| 430 — Preference decay function recommendation based on time and user selection | 0.406 | 0.603 | 0.717 | 0.786 | 0.822 |
| 440 — Similar user information utilization recommendation | 0.337 | 0.537 | 0.677 | 0.762 | 0.816 |

METHOD AND APPARATUS FOR MODELING USER PREFERENCES

CROSS-REFERENCE TO RELATED APPLICATIONS

This application claims the benefit under 35 USC § 119(a) of Korean Patent Application No. 10-2021-0143931, filed on Oct. 26, 2021, in the Korean Intellectual Property Office, the entire disclosure of which is incorporated herein by reference for all purposes.

BACKGROUND

1. Field

The following description relates to a method and apparatus for modeling user preferences.

2. Description of Related Art

There is a need for a content recommendation in an environment in which a high volume of content is provided. Since users have access to various content through electronic devices due to recent developments in information and communications technology (ICT) and the proliferation of available content, technology for recommending content that is preferred by the users is increasing in consequence.

To recommend content to users, various recommendation methods including a popularity-based recommendation method that recommends content accessed by other users may be available, and research is continuously being conducted to improve accuracy in recommending content desired by users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented user preference modeling method, the method including receiving preference scores corresponding to a plurality of items, receiving an input for selecting an item from among the plurality of items, decaying a preference score corresponding to one or more items from among the plurality of items included in a first list and a second list based on a time decay rate and a first parameter, in response to the selected item being included in the first list, decaying the preference score corresponding to the one or more items included in the first list and the second list based on a time decay rate and a second parameter, in response to the selected item being included in the second list, and increasing a preference score corresponding to the selected item, wherein the first list may include one or more of the plurality of items based on the preference scores, and wherein the first list is different from the second list.

The first list may include a number or less than the number of items from among the plurality of items based on the preference scores.

The increasing of the preference score corresponding to the selected item may include adding a weight to the preference score.

The time decay rate may include a rate at which a preference score is decayed based on a passage of time.

The first parameter may include a parameter for adjusting a rate at which the preference score is decayed based on a passage of time.

The first parameter may include a parameter for reducing a decay rate of the preference score.

The first parameter may include a parameter to reduce a decay rate of the preference score based on preference ranking information associated with an item in the first list, wherein the preference ranking information may include preference score corresponding to the item.

The second parameter may decay the preference score corresponding to the one or more items included in the first list more than the first parameter.

The second parameter may include a parameter having a value less than the first parameter.

The second parameter may include a parameter trained using a list comprising any one recommendation item as input data and a selection made by a user as ground truth data.

In another general aspect, there is provided a user preference modeling apparatus, the apparatus including a processor configured to receive preference scores corresponding to a plurality of items, receive an input for selecting an item from among the plurality of items, decay a preference score corresponding to one or more items from among the plurality of items included in a first list and a second list based on a time decay rate and a first parameter in response to the selected item being included in the first list, decay the preference score corresponding to the one or more items included in the first list and the second list based on a time decay rate and a second parameter in response to the selected item being included in the second list, and increase a preference score corresponding to the selected item, wherein the first list may include one or more of the plurality of items based on the preference scores, and wherein the first list is different from the second list.

The first list may include a number or less than the number of items from among the plurality of items based on the preference scores.

The processor may be configured to add a weight to the preference score.

The time decay rate may include a rate at which a preference score is decayed based on a passage of time.

The first parameter may include a parameter for adjusting a rate at which the preference score is decayed based on a passage of time.

The first parameter may include a parameter for reducing a decay rate of the preference score.

The first parameter may include a parameter to reduce a decay rate of the preference score based on preference ranking information associated with an item in the first list, wherein the preference ranking information may include preference score corresponding to the item.

The second parameter may be set to decay the preference score corresponding to the one or more items included in the first list more than the first parameter.

The second parameter may include a parameter having a value less than the first parameter.

The second parameter may include a parameter trained using a list comprising any one recommendation item as input data and a selection made by a user as ground truth data.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

It will be understood that when a component is referred to as being "connected to" another component, the component can be directly connected or coupled to the other component or intervening components may be present. In contrast, when a component is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The use of the term "may" herein with respect to an example or embodiment (e.g., as to what an example or embodiment may include or implement) means that at least one example or embodiment exists where such a feature is included or implemented, while all examples are not limited thereto.

As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Examples may be implemented as various types of products, such as, for example, a personal computer (PC), a laptop computer, a tablet computer, a smartphone, a television (TV), a smart home appliance, an intelligent vehicle, a kiosk, and a wearable device. Hereinafter, examples will be described in detail with reference to the accompanying drawings. In the drawings, like reference numerals are used for like elements.

Figure 1:
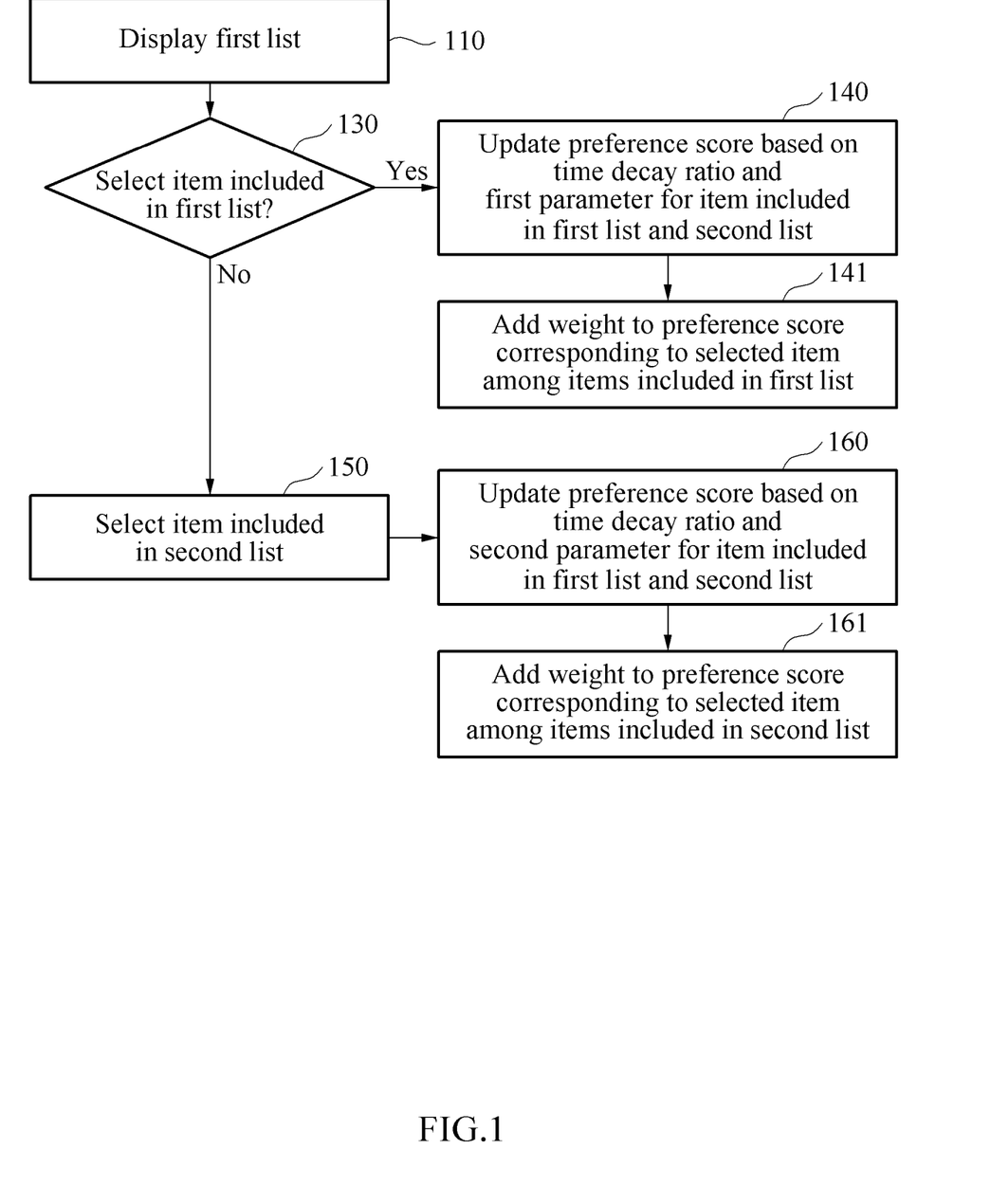
FIG. 1 illustrates an example of a method for modeling user preferences.

FIG. 1 illustrates an example of a method for modeling user preferences.

Hereinafter, a method for updating a preference score based on a user selection is described in detail with reference to FIG. 1. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions.

In an example, a processor 610 may receive preference scores corresponding to a plurality of items. An item may include an object selectable by a user. For example, the item may include a tangible object and/or an intangible object. The tangible object may include items such as bags, wallets, electronic devices, furniture, and daily necessities, which are selectable by the user. The intangible object may be an object that exists only in the human mind without a form. For example, the intangible object may include a movie, a conference room, music, a television show, and the like that the user may select.

A preference score may be a preference score of a user for each of the plurality of items. For example, user A may have a preference for each of the items, that is, a movie #1, a movie #2, and a movie #3, respectively. The processor 610 may receive a preference score of the user A. For example, the movie #1 may have a preference score of 9, the movie #2 may have a preference score of 6, and the movie #3 may have a preference score of 4. A higher preference score may indicate a higher preference for an item by the user. In an example, the preference score may be determined based on the number of selections made by the user. In an example, the preference score may initially be zero. When the number of selections by the user for the item increases, the preference score may also increase.

The processor 610 may receive an item selection input for selecting any one item among the plurality of items from the user. The processor 610 may select one item among the plurality of items that are displayed on the display. For example, a movie #1, a movie #2, a movie #3, and a movie #4 may be displayed on the display. In such case, the movie #1 may be selected by the user based on his or her preference. The processor 610 may receive a selection input for a movie #1 item from the user.

In an example, the plurality of items may be divided into a first list and a second list.

The first list may include a recommendation item determined based on preference scores. The first list may include any one recommendation item. For example, the processor 610 may determine items having top 10 preference scores as recommendation items. In another example, the processor 610 may determine items having top four preference scores as recommendation items. In such case, the first list may include the recommendation items having the top four preference scores.

The second list may include items other than the recommendation items. For example, 10 of 100 items may be the recommendation items. In such case, the 10 recommendation items may be included in the first list, and the remaining 90 items may be included in the second list. The second list may include an item that has not been selected by the user even once and/or items having a low preference score, the low preference score caused by no record of being recently selected by the user even when the user has previously selected such items.

In step 110, the processor 610 may provide a first list display 110. The processor 610 may display the first list through a display. The processor 610 may also display the second list. For example, the processor 610 may display the first list including the recommendation items at the top of the display and the second list at the bottom of the display. In another example, the processor 610 may display only the first list including the recommendation items through the display and display the second list through the display only when an additional input is received from the user.

The processor 610 may receive the item selection input for selecting any one item from among the plurality of items.

In step 130, the processor 610 may determine whether the selected item is included in the first list. When the item is included in the first list, in step 140, the processor 610 may decay a preference score corresponding to any one item included in the first list and the second list based on a time decay rate and a first parameter. In an example, the processor 610 may decay the preference score for the items included in the first list and the second list because a user's preference for an item tends to decrease over time.

The time decay rate may be a rate for decaying the preference score based on a passage of time. The user's preference score for a set item may decrease over time. For example, a user preference score for the movie #2 may decrease over time. In an example, the time decay rate may be a real number value between 0 and 1. Thus, when a preference score of a previous time is multiplied by the time decay rate, the preference score of a subsequent time may be smaller than the preference score of the previous time.

The first parameter may include a parameter for adjusting a rate at which the preference score is decayed over time. The processor 610 may adjust the rate at which the preference score is decayed by multiplying the time decay rate by the first parameter. The first parameter may include a parameter for reducing a decay rate of the preference score. For example, the first parameter may be a real number value between 0 and 1. In such case, when the processor 610 multiplies the time decay rate by the first parameter, the decay rate of the preference score may be reduced.

The processor 610 may increase a preference score corresponding to the selected item. In step 141, the processor 610 may add a weight to the preference score corresponding to the selected item among the items included in the first list and update the user's preference score by increasing the weight of the item selected by the user. Thus, it is possible to prevent information associated with the item previously selected by the user from being easily forgotten. That is, since some items previously preferred by the user from among the items previously preferred by the user may still be preferred, there may be a need to increase the preference score for the selected item even when the preference score is decaying over time.

In step 150, the processor 610 may determine whether the item included in the second list is selected by the item selection input. In step 160, the processor may update the preference score for items included in the first list and the second list based on a time decay rate and a second parameter. When there is no item preferred by the user in the first list based on the preference score, the user may not select an item from the first list including the recommendation item. Thus, when an item included in the second list is selected, the processor 610 may further decay preference scores corresponding to the items included in the first list and the second list. That is, when the item included in the second list is selected, the user may deviate from a previous pattern and show a pattern in which a recent item is preferred. For example, the user may adapt to a recent trend, deviate from the previous pattern, and select a recent item.

In step 161, the processor 610 may add 161 a weight to the preference score corresponding to the selected item from among the items included in the second list. For example, the plurality of items may be a movie #1, a movie #2, a movie #3, a movie #4, and a movie #5. The movie #1 and the movie #2 may be included in the first list as recommendation items, and the movie #3, the movie #4, and the movie #5 may be included in the second list. When the processor 610 receives a selection input for the movie #3 included in the second list, the processor 610 may decay preference scores for the movie #1, the movie #2, the movie #3, the movie #4, and the movie #5. The processor 610 may then increase a preference score by adding a weight to the preference score for the movie #3 included in the second list.

In an example, an item without a previous user selection history from among items included in the second list may have a preference score of 0. When such item is selected, the processor 610 may increase the preference score by adding a weight to the preference score. In another example, an item with a previous user selection history may be present among the items included in the second list. The preference score for such items may not be zero but may be very low. When such items are selected, the processor 610 may decay the preference score by multiplying the preference score by the time decay rate by the first parameter or the second parameter. In addition, the processor 610 may increase the preference score by adding a weight to the selected item after the preference score is decayed.

The second parameter may be set to decay a preference score corresponding to any one item included in the first list more than the first parameter. For example, the second parameter may be a real number value between 0 and 1, similar to the first parameter. The second parameter may include a parameter having a smaller value than the first parameter. For example, the second parameter may be $0.99^6$, and the first parameter may be $0.99^2$.

When the processor 610 receives a selection input for an item included in the second list, an item preferred by the user may not be included in the first list including the recommendation item. Thus, preference scores corresponding to the items included in the first list and the second list may be reduced to a greater extent, when the item included in the second list is selected compared to when the item included in the first list is selected, and the processor 610 may immediately reflect a recent trend and recommend a recent item to the user. The processor 610 may recommend items suitable for the user by decaying preference scores differently for items based on whether the item selected by the user is a recommendation item and reflecting recent trends.

In an example, the second parameter may include a parameter trained using a list that includes any one recommendation item as input data and using a user-selected item as ground truth data. The processor 610 may determine the second parameter through training. The processor 610 may use a list including any one recommendation item (e.g., a movie #1, a movie #2, a movie #3, a movie #4) as input data, and the second parameter may be learned using a user's selection input (e.g., a movie #1) as the ground truth data.

In an example, the second parameter may be trained using a neural network. The neural network or an artificial neural network (ANN) may generate mapping between input patterns and output patterns, and may have a generalization capability to generate a relatively correct output with respect to an input pattern that has not been used for training.

The neural network may be a model with a machine learning structure designed to extract feature data from input data and to provide an inference operation based on the feature data. The feature data may be data associated with a feature obtained by abstracting input data. If input data is an image, feature data may be data obtained by abstracting the image and may be represented in a form of, for example, a vector. The neural network may map input data and output data that are in a nonlinear relationship based on deep learning, to perform inference operation.

The methods and apparatus disclosed herein may update the preference score based on the time decay rate and the user's item selection information. When the preference score is updated only based on the time decay rate, the preference score of the item previously selected by the user may continue to be decayed such that information associated with the item that has been previously selected may be forgotten. However, even when the item has been previously selected by the user, the processor 610 may reflect information associated with a previous preference of the user corresponding to a current item selection of the user by increasing the preference score when the user selects a recent item.

Figure 2:
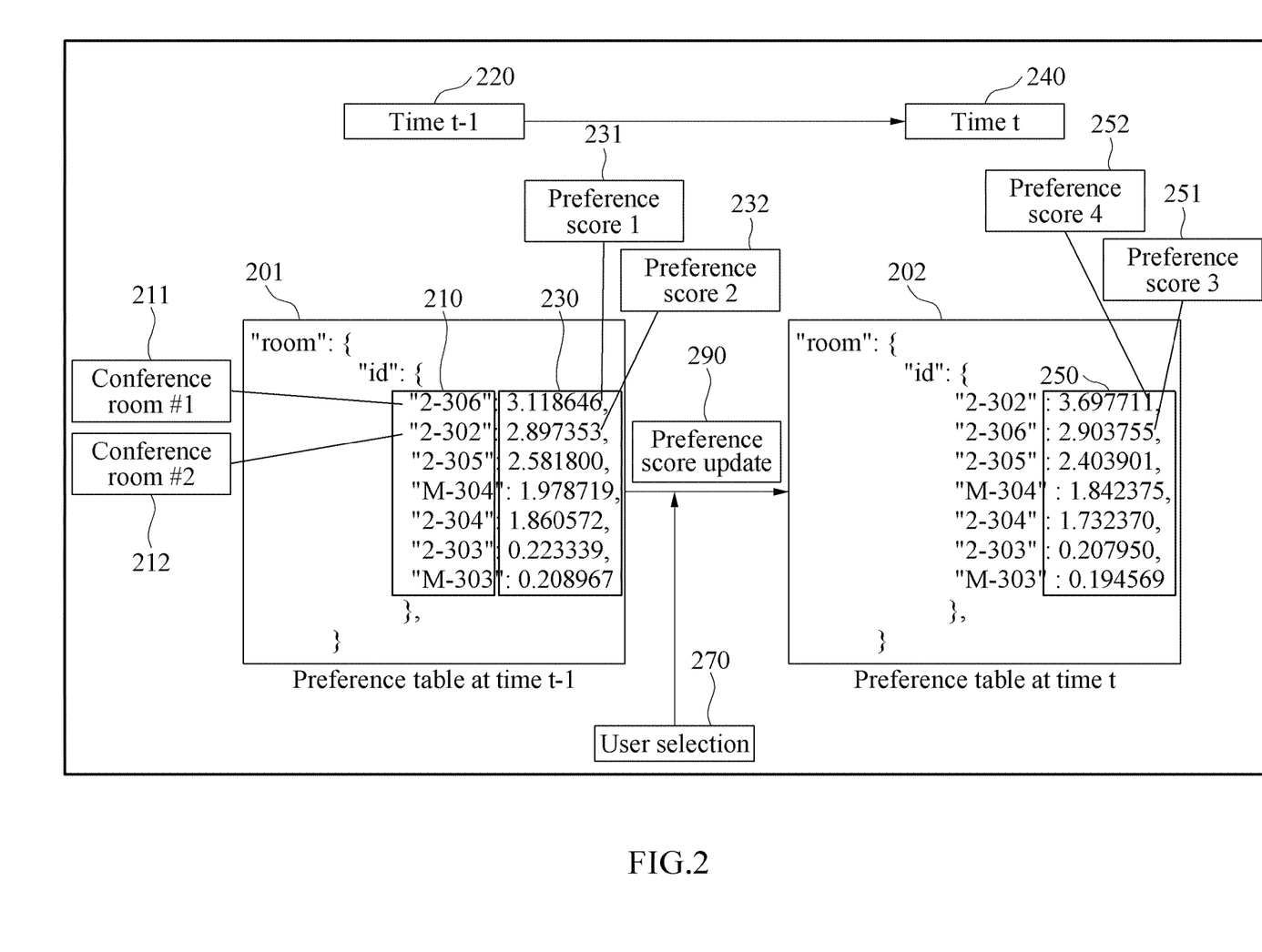
FIG. 2 illustrates an example of a process of updating a preference score of a user.

FIG. 2 illustrates an example of a process of updating a preference score of a user.

A preference table at time t−1 201 and a preference table at time t 202 are illustrated in FIG. 2. Each table may include a preference score 230 and an updated preference score 250.

In an example, a processor 610 may determine a recommendation item based on the preference score 230 at a time t−1 220. In determining the recommendation item, the processor 610 may include a conference room #1 211 and a conference room #2 212 having high preference scores as recommendation items in a first list. As illustrated in FIG. 2, a preference score 1 231 of the conference room #1 211 may have a high score of 3.118646, and a second preference score 232 of the conference room #2 212 may have a high score of 2.897353. That is, it is possible to know that the user prefers the conference room #1 211 or the conference room #2 212.

The processor 610 may receive a user selection 270. The processor 610 may update 290 the preference score based on the user selection 270 and the time decay rate. The preference table at time t 202 may display the updated preference score 250. When the selected item is in the conference room #2 212, the processor 610 may decay a preference score corresponding to the conference room #1 211 and the second conference room #2 212 included in the first list based on the time decay rate and the first parameter. In addition, the processor 610 may decay the preference score corresponding to another conference room that is not included in the first list. The processor 610 may also increase the preference score for the conference room #2 212 by adding a weight to the preference score for the conference room #2 212 that includes the selected item. Here, a preference score 4 252 of the conference room #2 212 at the time t 240 may be the highest at 3.697711.

Figure 3:
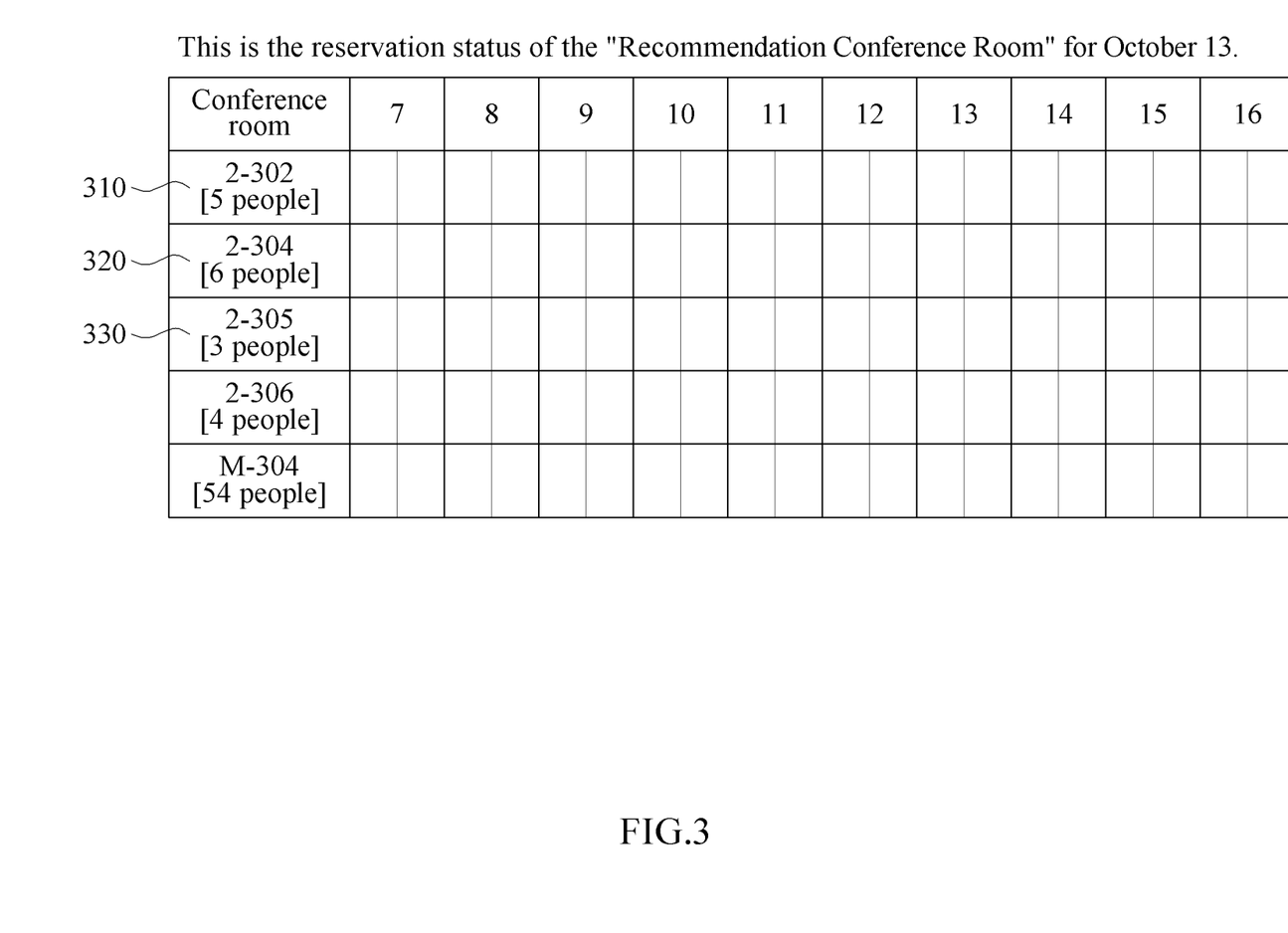
FIG. 3 illustrates an example of a recommendation item displayed to a user.

FIG. 3 illustrates an example of a recommendation item displayed to a user.

FIG. 3 illustrates an example of a display on which a first list including recommendation items is displayed. In this example, an item may be a conference room. Here, the processor 610 may output a conference room number with the highest preference score on the display based on an order of preference. In FIG. 3, 2-302 conference room 310 may have the highest preference score, and 2-304 conference room 320 and 2-305 conference room 330 may have the next highest preference score. A user may view recommendation conference room tables and select a conference room. In FIG. 3, numbers below the conference room number may represent the minimum number of people needed to reserve the conference room. For example, the minimum number of people needed to reserve the 2-302 conference room 310 may be 5. In another example, the minimum number of people needed to reserve the conference room 2-304 320 may be 6.

Figure 4:
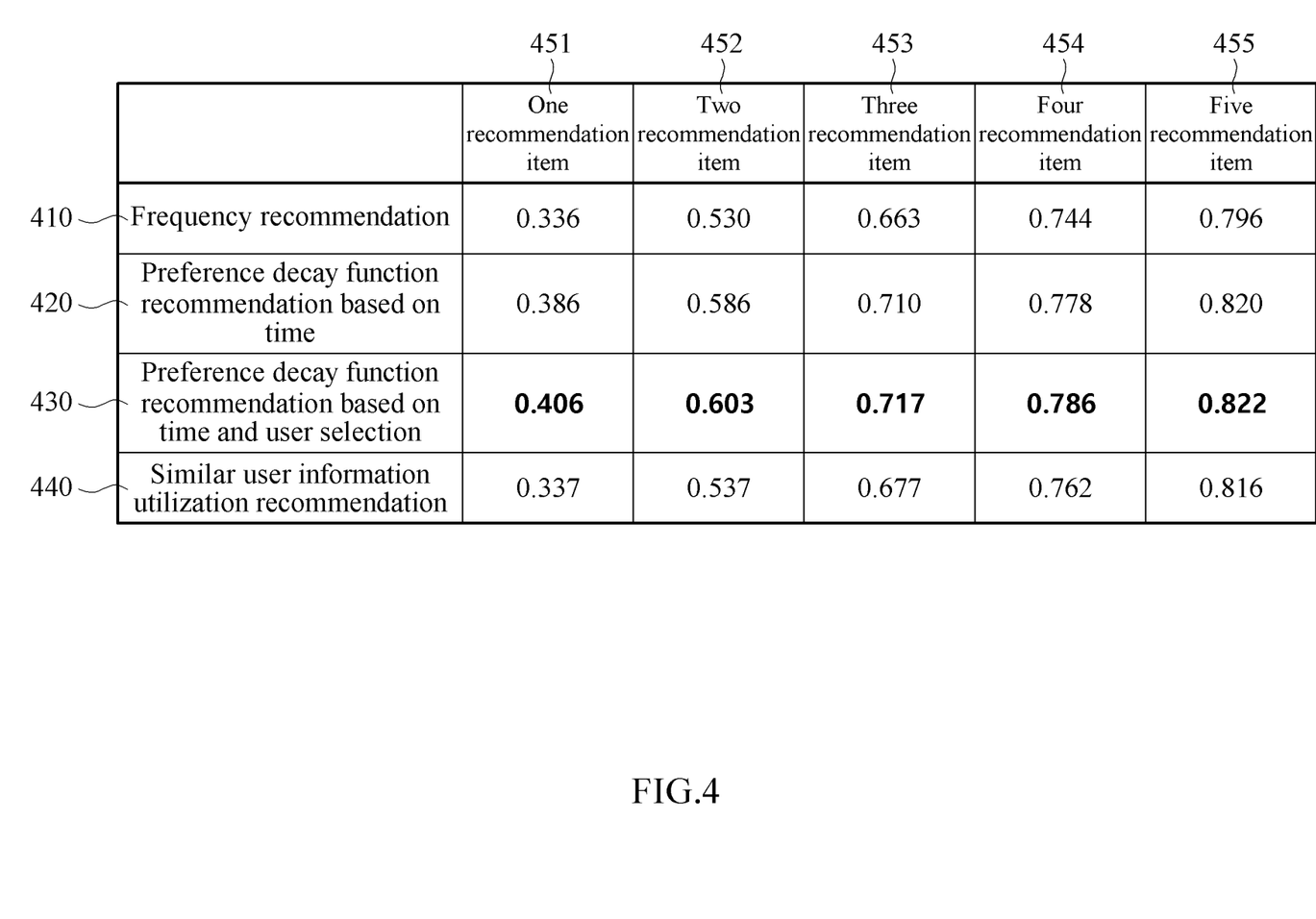
FIG. 4 illustrates an example of an accuracy of each user recommendation method.

FIG. 4 illustrates an example of an accuracy of each user recommendation method.

Frequency recommendation 410 may be a method of determining a preference score based on how many times a user selects an item.

Preference decay function recommendation 420 based on a period of time is a method in which preference scores decrease over a period of time.

Similar user utilization information recommendation 440 may be a method of recommending an item to a user using item selection data of another user.

In an example, a preference decay function recommendation 430 based on time and user selection may be used.

In an example, there may be one recommendation item 451, two recommendation items 452, three recommendation items 453, four recommendation items 454, and five recommendation items 455. That is, as shown in FIG. 4, the first list may include one item, two items, three items, four items, and five items.

As illustrated in FIG. 4, the preference decay function recommendation 430 method based on the time and the user selection may have the highest accuracy. Numbers listed in a table may represent a probability of a user selecting a recommendation item.

The first list may include a number or less than the number of any one recommendation item. The number of recommendation items may be randomly determined or may be determined based on category information of an item. For example, the first list may include five or less recommendation items. When the number of items is smaller instead of greater than the number of items included in the first list, the processor 610 may recommend an item having a higher accuracy (or possibility) of being preferred by the user.

Figure 5A:
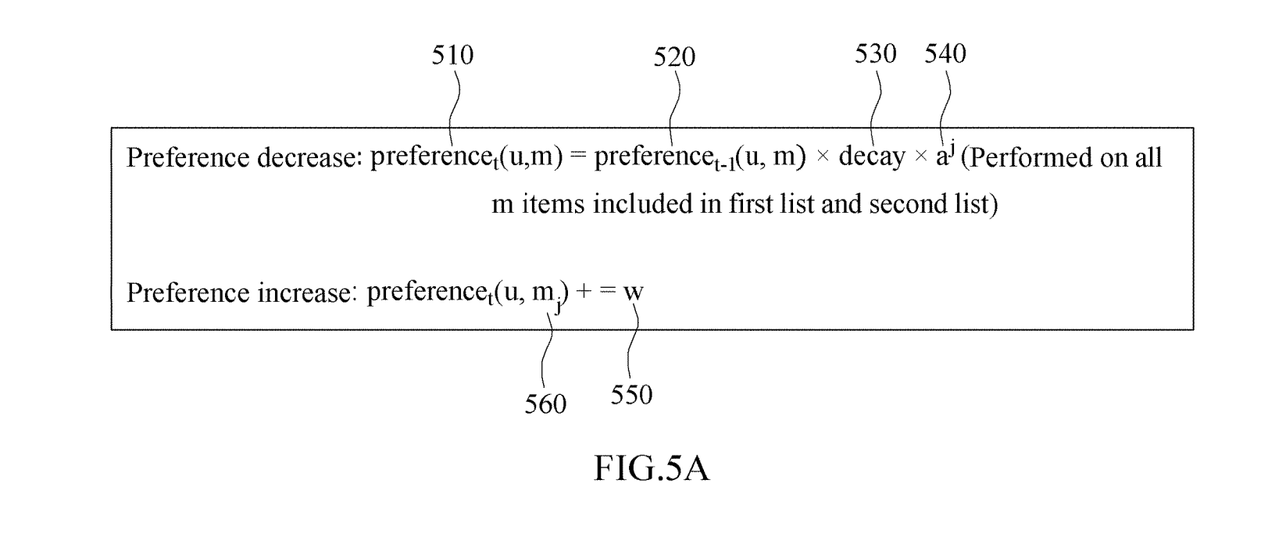
FIGS. 5A and 5B illustrate an example of a process of updating a preference score in response to an item being selected.
Figure 5B:
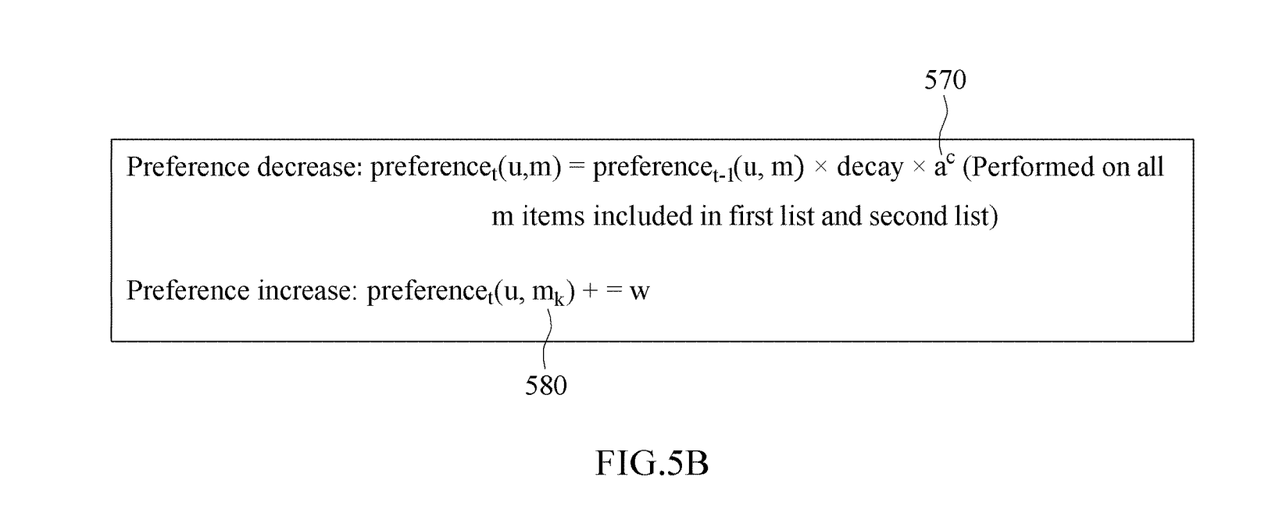

FIGS. 5A and 5B illustrate an example of a process of updating a preference score in response to an item being selected.

FIG. 5A illustrates an example of a process of updating a preference score when an item included in a first list is selected.

A preference$_t$ (u, m) 510 may be a preference score of a user u for an item m at a time t. A preference$_{t-1}$ (u, m) 520 may be a preference score of the user u for the item m at a time t−1. A decay 530 may be a time decay rate. For example, the time decay rate may be 0≤decay≤1. An $a^j$ 540 may be a first parameter. For example, $a^j$ may be 0.9≤a≤1. An item $m_j$ 560 may be an item selected from the first list. A preference$_t$ (u·$m_j$) may be a preference score of the user u for the item $m_j$ 560. A "w" 550 may be a weight.

The first parameter may include a parameter for reducing a decay rate of a preference score based on preference ranking information of any one item included in the first list. Of $a^j$ 540 illustrated in FIG. 5, j may be a recommendation item number of a recommendation item included in the first list. The recommendation item may be determined based on a preference score corresponding to each item. A recommendation item having the highest preference score may be recommendation item #1, and a recommendation item number having the next highest preference score may be recommendation item #2. When the recommendation item number decreases, a decay rate of the preference score may increase. For example, when a user selects recommendation item #1, the first parameter may be $0.99^1$. In another example, when a user selects recommendation item #2, the first parameter may be $0.99^2$. Since $0.99^2$ is less than $0.99^1$, the decay rate of the preference score may be greater when the recommendation item #2 is selected over the recommendation item #1. That is, the more the user selects an "item with a high probability of being selected by a user" predicted by the processor 610, the more the decay rate of the preference score may decrease.

The processor 610 may decrease the preference score for all items m included in the first list and the second list. In addition, the processor 610 may increase preference by adding a weight to only the item selected from the first list.

FIG. 5B illustrates an example of a process of updating a preference score when an item included in a second list is selected.

$a^c$ 570 may be a second parameter. Item $m_k$ 580 may be an item included in the second list. The second parameter may be smaller than the first parameter. For example, c in $a^c$ 570 may be greater than j in $a^j$ 540. Thus, when the item $m_k$ 580 included in the second list is selected instead of the item $m_j$ 560 included in the first list, the processor 610 may give preference to all items m included in the first list and the second list, and the preference score may be decayed to a greater extent.

When the recommendation item included in the first list is not selected by the user, the processor 610 may greatly decay the preference score over a period of time for all the items m included in the first list and the second list.

Figure 6:
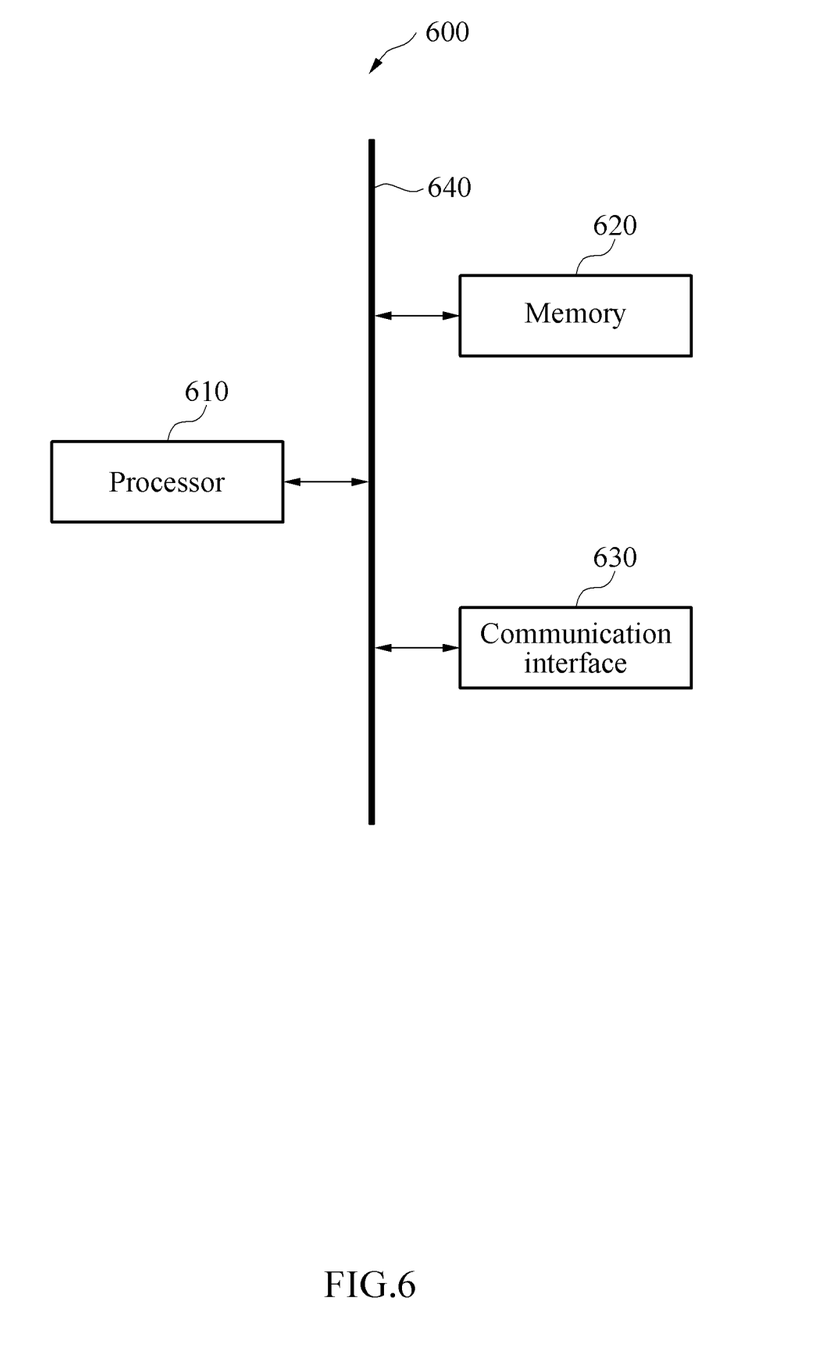
FIG. 6 illustrates an example of an electronic device.

FIG. 6 illustrates an example of an electronic device 600. The electronic device 600 may be implemented in devices, such as, for example, a personal computer (PC), a laptop computer, a data server, a mobile device, a mobile phone, a smart phone, a tablet PC, a mobile internet device (MID), a personal digital assistant (PDA), an enterprise digital assistant (EDA), a digital still camera, a digital video camera, a portable multimedia player (PMP), a speaker, a personal navigation device or portable navigation device (PND), a handheld game console, an e-book, a home appliance such as a television, a digital television (DTV), a smart television, a refrigerator, a smart home device, a smart speaker, a vehicle such as a smart vehicle, an Internet of Things (IoT) device, a portable device, or a smart device. The smart device may be implemented as a smart watch, a smart band, or a smart ring.

Referring to FIG. 6, an electronic device 600 may include a processor 610, a memory 620, and a communication interface 630. The processor 610, the memory 620, and the communication interface 630 may be connected to each other through a communication bus 640.

The memory 620 may store various information generated in the processing process of the processor 610 described above. The memory 620 stores instructions (or programs) executable by the processor 610. For example, the instructions include instructions to perform an operation of the processor 610. In addition, the memory 620 may store various data and programs. The memory 620 may include a volatile memory or a non-volatile memory. The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM). The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further description regarding the memory 620 is provided below.

The processor 610 may process data stored in the memory 300. The processor 610 may execute a computer-readable code (for example, software) stored in the memory 620 and instructions triggered by the processor 610.

The "processor 610" may be a data processing device implemented by hardware including a circuit having a physical structure to perform desired operations. For example, the desired operations may include code or instructions included in a program.

For example, the hardware-implemented data processing device may include a microprocessor, a single processor, an independent processors, a parallel processors, a single-instruction single-data (SISD) multiprocessing, a single-instruction multiple-data (SIMD) multiprocessing, a multiple-instruction single-data (MISD) multiprocessing, a multiple-instruction multiple-data (MIMD) multiprocessing, a microcomputer, a processor core, a multi-core processor, a multiprocessor, a central processing unit (CPU), a neural processing unit (NPU), a graphics processing unit (GPU), a tensor processing unit (TPU), a digital signal processor (DSP), a controller and an arithmetic logic unit (ALU), a field-programmable gate array (FPGA), an application-specific integrated circuit (ASIC), a programmable logic unit (PLU), or an application processor (AP). Further description regarding the processor 610 is provided below.

The processor 610 may execute a program and control the electronic device 600. A program code to be executed by the processor 610 may be stored in the memory 620.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-5B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. In an example, the instructions or software includes at least one of an applet, a dynamic link library (DLL), middleware, firmware, a device driver, an application program storing the user preference modeling method. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   receiving a user input for selecting an item from among a select plurality of items having been organized, dependent on a corresponding preference score of each of the plurality of items, between a first list and a second list;
   in response to the selected item being comprised in the first list, decaying respective preference scores based on a first time decay rate and a first time decay rate adjustment parameter, where the respective preference scores correspond to one or more items comprised in the first list and one or more items comprised in the second list;
   in response to the selected item being comprised in the second list, decaying the respective preference scores based on a second time decay rate and a second time decay rate adjustment parameter; and
   based on the user's input of the selected item, performing an increasing operation with respect to the corresponding preference score of the selected item,
   wherein the one or more items in the first list are different from the one or more items in the second list, and
   wherein the second time decay rate adjustment parameter is a parameter having a value less than the first time decay rate adjustment parameter.

2. The method of claim 1, wherein the corresponding preference scores of the one or more items in the first list are greater than the corresponding preference scores of one or more items in the second list.

3. The method of claim 1, wherein the performing of the increasing operation comprises: adding a weight to the corresponding preference score of the selected item.

4. The method of claim 1, wherein the first time decay rate adjustment parameter controls a first effective time decay rate, based on the first time decay rate and the first time decay rate adjustment parameter, that is applied to the respective preference scores to be less than the first time decay rate.

5. The method of claim 1,
   wherein the first time decay rate adjustment parameter is based on preference ranking information associated with at least one item in the first list, and the first time decay rate adjustment parameter controls a first effective time decay rate, based on the first time decay rate and the first time decay rate adjustment parameter, that is applied to the respective preference scores to be less than the first time decay rate, and
   wherein the preference ranking information comprises the corresponding preference score of the at least one item.

6. The method of claim 1, wherein the second time decay rate adjustment parameter controls a second effective time decay rate, based on the second time decay rate and the second time decay rate adjustment parameter, that is applied to the respective preference scores to be respectively greater than the second time decay rate and more than a first effective time decay rate that is based on the first time decay rate and the first time decay rate adjustment parameter.

7. The method of claim 1, wherein the second time decay rate adjustment parameter is a parameter trained using a list comprising any one recommendation item as input data and a selection made by a user as ground truth data.

8. A non-transitory computer-readable storage medium storing instructions that, when executed by a processor, cause the processor to perform the method of claim 1.

9. An apparatus, the apparatus comprising:
   a processor configured to:
   receive a user input for selecting an item from among a select plurality of items having been organized, dependent on a corresponding preference score of each of the plurality of items, between a first list and a second list;
   in response to the selected item being comprised in the first list, decay respective preference scores based on a first time decay rate and a first time decay rate adjustment parameter, where the respective preference scores correspond to one or more items comprised in the first list and one or more items comprised in the second list;
   in response to the selected item being comprised in the second list, decay the respective preference scores based on a second time decay rate and a second time decay rate adjustment parameter; and
   based on the user's input of the selected item, perform an increasing operation with respect to the corresponding preference score of the selected item,
   wherein the one or more items in the first list are different from the one or more items in the second list,
   wherein the second time decay rate adjustment parameter is a parameter having a value less than the first time decay rate adjustment parameter.

10. The apparatus of claim 9, wherein the corresponding preference scores of the one or more items in the first list are greater than the corresponding preference scores of one or more items in the second list.

11. The apparatus of claim 9, wherein, for the performance of the increasing operation with respect to the corresponding preference score of the selected item, the processor is configured to add a weight to the corresponding preference score of the selected item.

12. The apparatus of claim 9, wherein the first time decay rate adjustment parameter controls a first effective time decay rate, based on the first time decay rate and the first time decay rate adjustment parameter, that is applied to the respective preference scores to be less than the first time decay rate.

13. The apparatus of claim 9,
wherein the first decay rate adjustment parameter is based on preference ranking information associated with at least one item in the first list, and the first time decay rate adjustment parameter controls a first effective time decay rate, based on the first time decay rate and the first time decay rate adjustment parameter, that is applied to the respective preference scores to be less than the first time decay rate, and
wherein the preference ranking information comprises the corresponding preference score of to the at least one item.

14. The apparatus of claim 9, wherein the second time decay rate adjustment parameter controls a second effective time decay rate, which is based on the second time decay rate and the second time decay rate adjustment parameter, that is applied to the respective preference scores to be more than the second time decay rate and more than a first effective time decay rate based on the first time decay rate and the first time decay rate adjustment parameter.

15. The apparatus of claim 9, wherein the second time decay adjustment parameter is a parameter trained using a list comprising any one recommendation item as input data and a selection made by a user as ground truth data.

16. The method of claim 1,
wherein the respective preference scores include the corresponding preference score of the selected item, and
wherein performing of the increasing operation comprises increasing the decayed preference score corresponding to the selected item.

17. An apparatus, the apparatus comprising:
a processor configured to:
training a machine learning model using training data that includes a list comprising any one recommendation item as training input data and respective training selections made by a user as ground truth data;
in response to a selected item being comprised in a first list, decay respective preference scores based on a first time decay rate and a first time decay rate adjustment parameter, where the respective preference scores correspond to one or more items comprised in the first list and one or more items comprised in a second list;
in response to the selected item being comprised in the second list, decay the respective preference scores based on a second time decay rate and a second time decay rate adjustment parameter; and
based on a user's input of the selected item, increase a corresponding preference score of the selected item or increase the decayed preference score corresponding to the selected item,
wherein the one or more items in the first list are different from the one or more items in the second list,
wherein the first decay rate adjustment parameter is based on preference ranking information, associated with at least one item in the first list, and a corresponding preference score of the at least one item,
wherein the second decay rate adjustment parameter is a parameter having a value less than the first time decay rate adjustment parameter and is determined through an inference operation of the trained machine learning model, and
wherein the user's input of the selected item is based on the user's selection of an item from among a select plurality of items having been organized, dependent on a corresponding preference score of each of the plurality of items, between the first list and the second list.

18. The apparatus of claim 17, wherein the first time decay rate adjustment parameter controls a first effective time decay rate, based on the first time decay rate and the first time decay rate adjustment parameter, that is applied to the respective preference scores to be less than the first time decay rate.

19. The apparatus of claim 17, wherein the second time decay rate adjustment parameter controls a second effective time decay rate, which is based on the second time decay rate and the second time decay rate adjustment parameter, that is applied to the respective preference scores to be more than the second time decay rate and more than a first effective time decay rate based on the first time decay rate and the first time decay rate adjustment parameter.

* * * * *